(12) United States Patent
Hou (10) Patent No.: US 11,706,050 B2
(45) Date of Patent: Jul. 18, 2023

(54) POLLING METHOD AND SYSTEM FOR SERVER SENSORS, AND RELATED APPARATUS

(71) Applicant: INSPUR SUZHOU INTELLIGENT TECHNOLOGY CO., LTD., Jiangsu (CN)

(72) Inventor: Zhili Hou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/914,505

(22) PCT Filed: Sep. 28, 2020

(86) PCT No.: PCT/CN2020/118310
§ 371 (c)(1),
(2) Date: Sep. 26, 2022

(87) PCT Pub. No.: WO2021/212748
PCT Pub. Date: Oct. 28, 2021

(65) Prior Publication Data
US 2023/0118722 A1    Apr. 20, 2023

(30) Foreign Application Priority Data
Apr. 23, 2020   (CN) .......................... 202010327083.0

(51) Int. Cl.
*H04L 12/403* (2006.01)
*G06F 11/22* (2006.01)
*G06F 11/30* (2006.01)

(52) U.S. Cl.
CPC ........ *H04L 12/403* (2013.01); *G06F 11/2289* (2013.01); *G06F 11/30* (2013.01)

(58) Field of Classification Search
None
See application file for complete search history.

(56) References Cited

U.S. PATENT DOCUMENTS

| | | | |
|---|---|---|---|
| 5,659,787 A * | 8/1997 | Schieltz | H04N 7/181 |
| | | | 348/E7.086 |
| 7,705,721 B1 * | 4/2010 | Chen | G06F 11/30 |
| | | | 714/47.1 |

(Continued)

FOREIGN PATENT DOCUMENTS

| CN | 105528273 A | 4/2016 |
|---|---|---|
| CN | 107302465 A | 10/2017 |

(Continued)

OTHER PUBLICATIONS

International Search Report cited in PCT application PCT/CN2020/118310, dated Jan. 27, 2021, 7 pages.

(Continued)

*Primary Examiner* — Benjamin Lamont
(74) *Attorney, Agent, or Firm* — Cooper Legal Group, LLC (57) ABSTRACT

A polling method for server sensors, a polling system for server sensors, and a computer-readable memory medium. The polling method includes: when a BMC is activated, acquiring attribute information of sensors (S101); classifying the sensors according to polling cycles in the attribute information (S102); adding the sensors with the same polling cycle into a same preset data structure (S103); and polling the sensors in the preset data structure using a thread (S104). According to the method, the problem of low polling efficiency caused by polling sensors with different cycles using a single thread may be solved, and each sensor may be polled independently while minimizing influences between polling of the sensors.

19 Claims, 6 Drawing Sheets

(56) References Cited

U.S. PATENT DOCUMENTS

| | | | |
|---|---|---|---|
| 9,264,320 B1* | 2/2016 | Shevenell | H04L 47/6235 |
| 2004/0133398 A1* | 7/2004 | Merkin | G06F 11/3058 |
| | | | 702/188 |
| 2005/0240666 A1* | 10/2005 | Xu | H04L 41/00 |
| | | | 709/223 |
| 2012/0023367 A1 | 1/2012 | Rudy et al. | |
| 2012/0144223 A1 | 6/2012 | Kasahara et al. | |
| 2014/0156093 A1* | 6/2014 | Brian | G01D 4/002 |
| | | | 700/291 |
| 2019/0265661 A1* | 8/2019 | Sakellariadis | H04L 12/2816 |
| 2021/0294596 A1* | 9/2021 | Ashirvad | H04L 41/142 |

FOREIGN PATENT DOCUMENTS

| | | |
|---|---|---|
| CN | 108259270 U | 7/2018 |
| CN | 108628685 A | 10/2018 |
| CN | 109005226 A | 12/2018 |
| CN | 109495303 A | 3/2019 |
| CN | 111538629 A | 8/2020 |

OTHER PUBLICATIONS

Written Opinion of International Searching Authority of corresponding PCT application PCT/CN2020/118310, dated Jan. 27, 2021, 11 pages.

Corresponding Chinese Patent Application No. 202010327083.0, First Office Action dated Sep. 29, 2022.

* cited by examiner

POLLING METHOD AND SYSTEM FOR SERVER SENSORS, AND RELATED APPARATUS

This application claims priority to Chinese Patent Application No. 202010327083.0, filed on Apr. 23, 2020, in China National Intellectual Property Administration and entitled "Polling Method and System for Server Sensors, and Related Apparatus", the contents of which are hereby incorporated by reference in its entirety.

FIELD

The present application relates to the field of servers, and particularly to a polling method and system for server sensors, and a related apparatus.

BACKGROUND

A Baseboard Management Controller (BMC) (or server processor) is a dedicated chip/controller, the core of an Intelligent Platform Management Interface (IPMI)-based system. In an IPMI management platform, system management software manages each managed device by communication with the BMC.

The BMC monitors each component of a server by monitoring sensors. The server includes various sensors, including a temperature sensor, a voltage sensor, a power consumption sensor, a state sensor, etc. The BMC reads a reading of each sensor to determine a health condition of the current server, correspondingly controls a fan according to a certain logic and algorithm, generates and reports a system log, etc.

In a software system of a current BMC, sensors are read mainly by dividing the sensors into two types, i.e., a discrete type and a continuous type. All the sensors are traversed first to determine sensor types and traversing cycles. After a cycle is reached, processing is performed through a discrete or continuous reading processing function according to the sensor type. Then, the next sensor is traversed. This mode has certain defects. First, the sensors are divided into the two discrete and continuous types, the classification granularity is relatively small, and not all application scenarios can be covered. In addition, all the sensors are traversed in a single thread, whereby when the traversing cycles of the sensors are relatively short or there is a waiting delay, etc., in the processing function, the requirement for periodicity cannot be met, and values of the sensors cannot be updated timely.

SUMMARY

An objective of the present application is to provide a polling method and system for server sensors, and a computer-readable memory medium, which may reduce influences between polling of sensors.

In order to solve the foregoing technical problem, the present application provides a polling method for server sensors. The specific technical solution is implemented by the following steps:

in response to a BMC being activated, acquiring attribute information of sensors;

classifying the sensors according to polling cycles in the attribute information;

adding the sensors with a same polling cycle into a same preset data structure; and polling the sensors in the preset data structure using a thread.

Alternatively, the preset data structure includes a circular queue, a linear queue, or an array.

Alternatively, the step of adding the sensors with the same polling cycle into the same preset data structure includes:

preferentially adding the sensors with high priorities in the sensors with the same polling cycle into the same preset data structure.

Alternatively, the step of polling the sensors in the preset data structure using the thread includes:

in response to the cycle corresponding to the preset data structure being reached, polling the sensors in the preset data structure using child threads initiated by a main thread of the BMC, wherein a number of the child threads corresponds to a number of the sensors in the preset data structure.

Alternatively, the step of polling the sensors in the preset data structure using the thread includes:

allocating an independent thread to each preset data structure using the main thread of the BMC; and in response to the cycle corresponding to the preset data structure being reached, polling the sensors in the preset data structure using the independent thread.

Alternatively, in a circumstance where the polling cycle of any sensor is reached, the method further includes:

selecting a target sensor from the preset data structure, and acquiring corresponding current attribute information;

determining, according to a polling state in the current attribute information, whether a previous polling thread is completed;

in response to YES, adding thread information into a polling thread information structure, and adding the current attribute information into a tail of the preset data structure; and in response to NO, adding the current attribute information into the tail of the preset data structure.

Alternatively, the method further includes:

in response to polling threads being initiated for all the sensors in the preset data structure, performing sensor polling cycle holding.

Alternatively, the method further includes:

defining a read offset, write offset, queue size, and data pointer of the preset data structure to create the preset data structure.

Alternatively, during the polling of the sensors in the preset data structure using child threads initiated by the main thread of the BMC, the method further includes:

recording, in a polled sensor, a thread Identifier (ID) of the child thread, a polling state field, and an Inter-Integrated Circuit (I2C) bus.

Alternatively, in a circumstance where the child thread does not obtain data of the polled sensor, the method further includes:

determining whether polling time of the polled sensor is longer than polling cycle time corresponding to the preset data structure where a target sensor is located;

in response to YES, re-adding the polled sensor into the preset data structure, and performing re-polling in response to a next polling cycle being reached;

in response to NO, determining, according to the polling state field, whether a reading exception occurs to the child thread; and in response to the reading exception occurring to the child thread, resetting an I2C bus, or forcibly exiting the child thread according to the thread ID.

Optionally, in a circumstance where the reading exception occurs to the child thread, the method further includes:

generating and uploading an alert log according to the polling state field.

The present application also provides a polling system for server sensors, including:

an acquisition module, configured to, in response to a BMC being activated, acquire attribute information of sensors;

a classification module, configured to classify the sensors according to polling cycles in the attribute information;

a queue filling module, configured to add the sensors with a same polling cycle into a same preset data structure; and a thread management module, configured to poll the sensors in the preset data structure using a thread.

The present application also provides a computer-readable memory medium, storing computer program. The computer program is executed by a processor to implement the steps of the method as described above.

The present application provides a polling method for server sensors, including: when a BMC is activated, acquiring attribute information of sensors; classifying the sensors according to polling cycles in the attribute information; adding the sensors with the same polling cycle into a same preset data structure; and polling the sensors in the preset data structure using a thread.

According to the present application, sensors with a same polling cycle are classified into a same preset data structure first according to a polling cycle of each sensor. When the polling cycle of a sensor is reached, since the polling cycles of the sensors in each preset data structure are the same, all the sensors in the preset data structure may be polled directly. Therefore, the problem of low polling efficiency caused by polling sensors with different cycles using a single thread is solved. Since the sensors with the same polling cycle are in the same preset data structure, preset data structure is taken as a thread polling unit, and not all the sensors are taken as polling targets. Therefore, each sensor may be polled independently while minimizing influences between polling of the sensors. The present application also provides a polling system for server sensors and a computer-readable memory medium, which have the foregoing beneficial effects. Elaborations are omitted herein.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

In order to make the objective, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
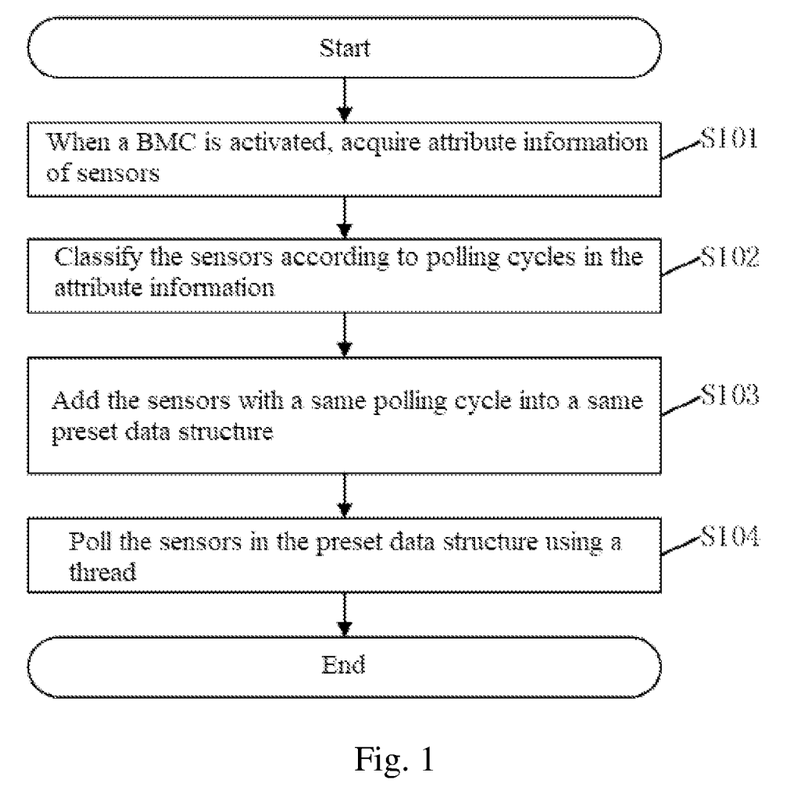
FIG. 1 is a flowchart of a polling method for server sensors according to an embodiment of the present application.

Referring to FIG. 1, FIG. 1 is a flowchart of a polling method for server sensors according to an embodiment of the present application. The method includes the following steps.

In S101, when a BMC is activated, attribute information of sensors is acquired.

The embodiment of the present application aims to implement BMC sensor classification and cyclic polling based on preset data structures. Specifically, when the BMC is activated, attribute information of sensors is acquired first. Here, contents of the attribute information are not specifically limited, but at least include a polling cycle of the sensor. In addition, preferably, the attribute information may further include a sensor type, a sensor number, a polling thread information structure, etc.

In S102, the sensors are classified according to polling cycles in the attribute information.

In S103, the sensors with a same polling cycle are added into a same preset data structure.

Afterwards, the sensors are classified according to polling cycles acquired in S101, namely the sensors with a same polling cycle are divided into the same class, and the sensors with the same polling cycle are added into the same preset data structure. A type of the preset data structure is not limited herein. The preset data structure includes a circular queue, a linear queue, or an array. Certainly, the preset data structure may also be other first-in first-out data structures, which will not be limited herein one by one with examples.

As a preferred implementation mode, when this step is performed, the sensors with high priorities in the sensors with the same polling cycle may be added into the same preset data structure preferentially. It is easily understood that different sensors of a server are of different importance. For example, monitoring sensors of the server, including a temperature sensor or a sensor related to a fan, are more important than performance monitoring sensors, and may avoid failures of the server effectively and ensure normal operation of the server. Therefore, a priority of the temperature sensor is relatively high. Certainly, priorities of the sensors in the server are not specifically limited and ranked herein, and those skilled in the art may rank the priorities of the sensors as practically needed, and when the sensors are added into preset data structures, may add the sensors with high priorities preferentially for preferential polling during subsequent polling, thereby acquiring relatively important sensor data.

Certainly, it is easily understood that creation of the preset data structure is further needed by default in the embodiment of the present application. How to create the preset data structure is not specifically limited herein. Preferably, parameter information such as a read offset, write offset, queue size, and data pointer of the preset data structure may be defined to create the preset data structure.

In S104, the sensors in the preset data structure are polled using a thread.

After the sensors with the same polling cycle are added into the same preset data structure, the preset data structure may be polled using the thread. Certainly, it can be understood that polling satisfies the condition that the polling cycle is reached. That is, when the polling cycle of any sensor in the preset data structure is reached, the thread polls all the sensors in the preset data structure. A specific polling sequence may be an additional sequence of the sensors.

How to poll the sensors in the preset data structure using the thread is not limited herein. Preferably, the embodiment of the present application provides two thread polling modes.

In the first mode, when the cycle corresponding to the preset data structure is reached, the sensors in the preset data structure are polled using child threads initiated by a main thread of the BMC. In such case, the number of the child threads corresponds to the number of the sensors in the preset data structure.

Figure 2:
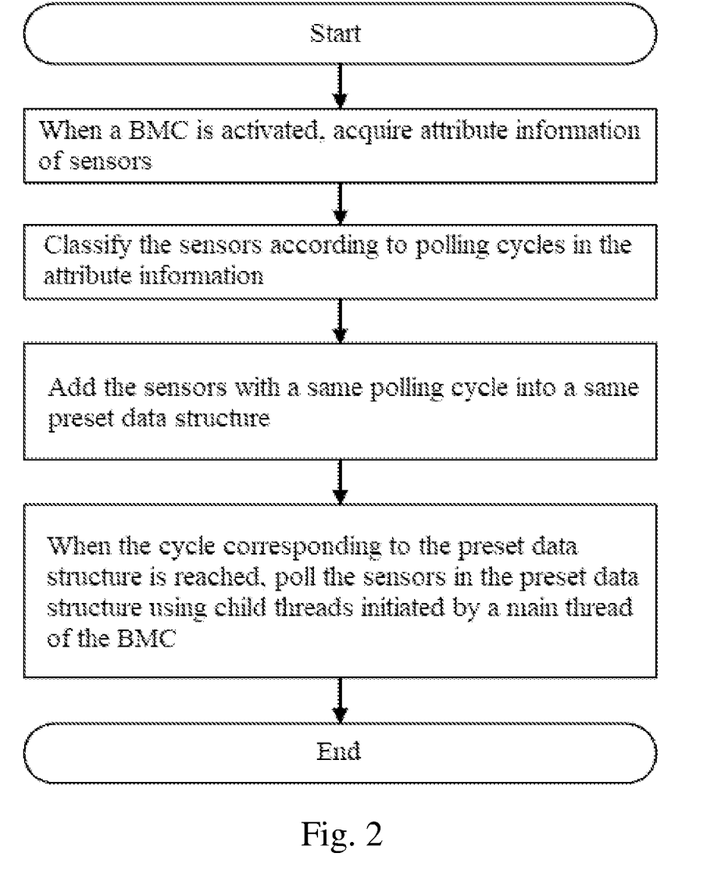
FIG. 2 is a flowchart of another polling method for server sensors according to an embodiment of the present application.

Since the number of the sensors added into the preset data structure is known, when the polling cycle of any sensor in a certain preset data structure is reached, it means that all the sensors in the preset data structure need to be polled. In such case, the main thread of the BMC may allocate corresponding child threads according to the number of the sensors in the preset data structure. It is to be noted that the number of the child threads is usually the same as that of the sensors, namely each child thread acquires data of one sensor. In this mode, the main thread of the BMC may purposefully poll the sensors whose polling cycles are reached. Compared with polling all the sensors using the single thread, thread polling used in this mode has the advantages that the polling pertinence is high, and data acquisition may be performed synchronously on all the sensors needed to be polled so as to improve the polling efficiency significantly. In such case, an implementation process corresponding to this solution may be as shown in FIG. 2.

In the second mode, an independent thread is allocated to each preset data structure using a main thread of the BMC, and when the cycle corresponding to the preset data structure is reached, the sensors in the preset data structure are polled using the independent thread.

Figure 3:
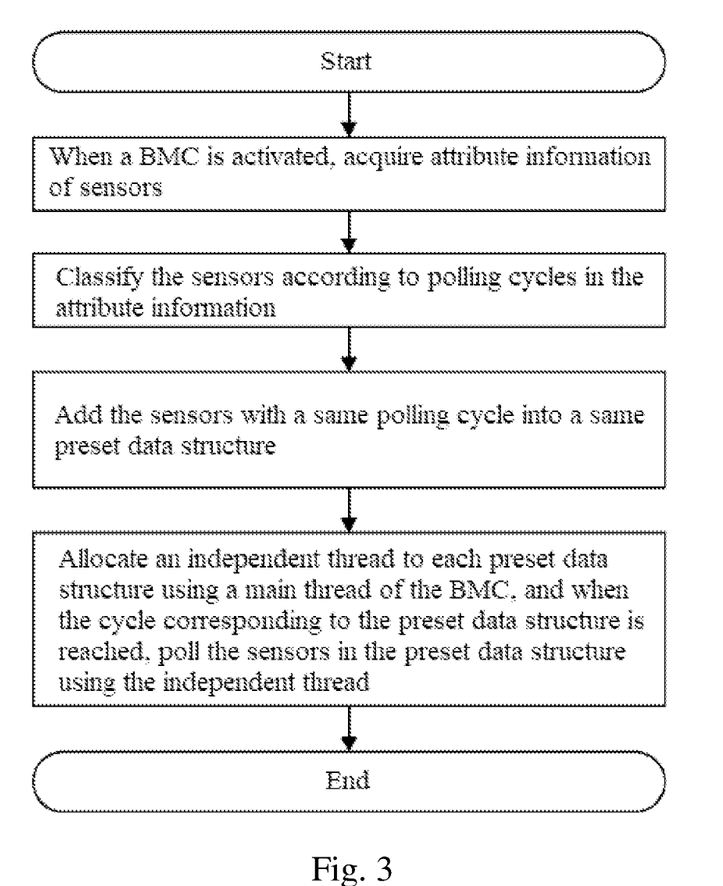
FIG. 3 is a flowchart of yet another polling method for server sensors according to an embodiment of the present application.

It is to be noted that, in the second mode, the main thread of the BMC does not directly transmit child threads to poll the sensors, and instead, allocates an independent thread first for each preset data structure. Certainly, all the independent threads are managed by the main thread of the BMC. The number of the independent threads is usually the same as that of the preset data structures. That is, there is an independent thread corresponding to each preset data structure. Then, when the cycle corresponding to the preset data structure is reached, the sensors in the preset data structure are polled by the independent thread. It is to be noted that, when the sensors in the preset data structure are polled using the independent thread, the independent thread may poll the sensors one by one, or the independent thread may transmit child threads to poll the sensors in the preset data structure respectively. A specific mode to be used may be set freely according to the number of the sensors in the preset data structure, and is not specifically limited herein. Compared with the first mode, the second mode has the advantage that the independent thread is allocated to each preset data structure, whereby the sensor polling efficiency is directly improved by use of multiple threads. In addition, a polling task of each preset data structure is allocated to the corresponding independent thread, and when a polling exception occurs subsequently, a cause for the exception may be directly found, namely the independent thread corresponding to the preset data structure with the polling exception is directly detected, whereby not only may the polling efficiency be improved, but also the polling error tolerance rate may be improved. Each preset data structure is managed independently by an independent thread, whereby values of the sensors may be updated timely even though traversing cycles of the sensors are relatively short or there is a waiting delay, etc., in a processing function, and the condition that the value of each sensor cannot be updated for the sake of only one thread is avoided. In such case, an implementation process corresponding to this solution may be as shown in FIG. 3.

According to the present application, sensors with a same polling cycle are classified into a same preset data structure first according to a polling cycle of each sensor. When the polling cycle of a sensor is reached, since the polling cycles of the sensors in each preset data structure are the same, all the sensors in the preset data structure may be polled directly. Therefore, the problem of low polling efficiency caused by polling sensors with different cycles using a single thread is solved. Since the sensors with the same polling cycle are in the same preset data structure, preset data structure is taken as a thread polling unit, and not all the sensors are taken as polling targets. Therefore, each sensor may be polled independently while minimizing influences between polling of the sensors.

Based on the above-mentioned embodiment, during the polling of the sensors in the preset data structure using the child threads initiated by the main thread of the BMC, a thread ID of the child thread, a polling state field, and an I2C bus may further be recorded in a polled sensor.

In the present embodiment, a child thread polling process is further defined. That is, when a child thread polls a sensor, the polled sensor records a thread ID of the child thread, a polling state field, and an I2C bus, so as to implement source tracing in case of a polling exception.

Figure 4:
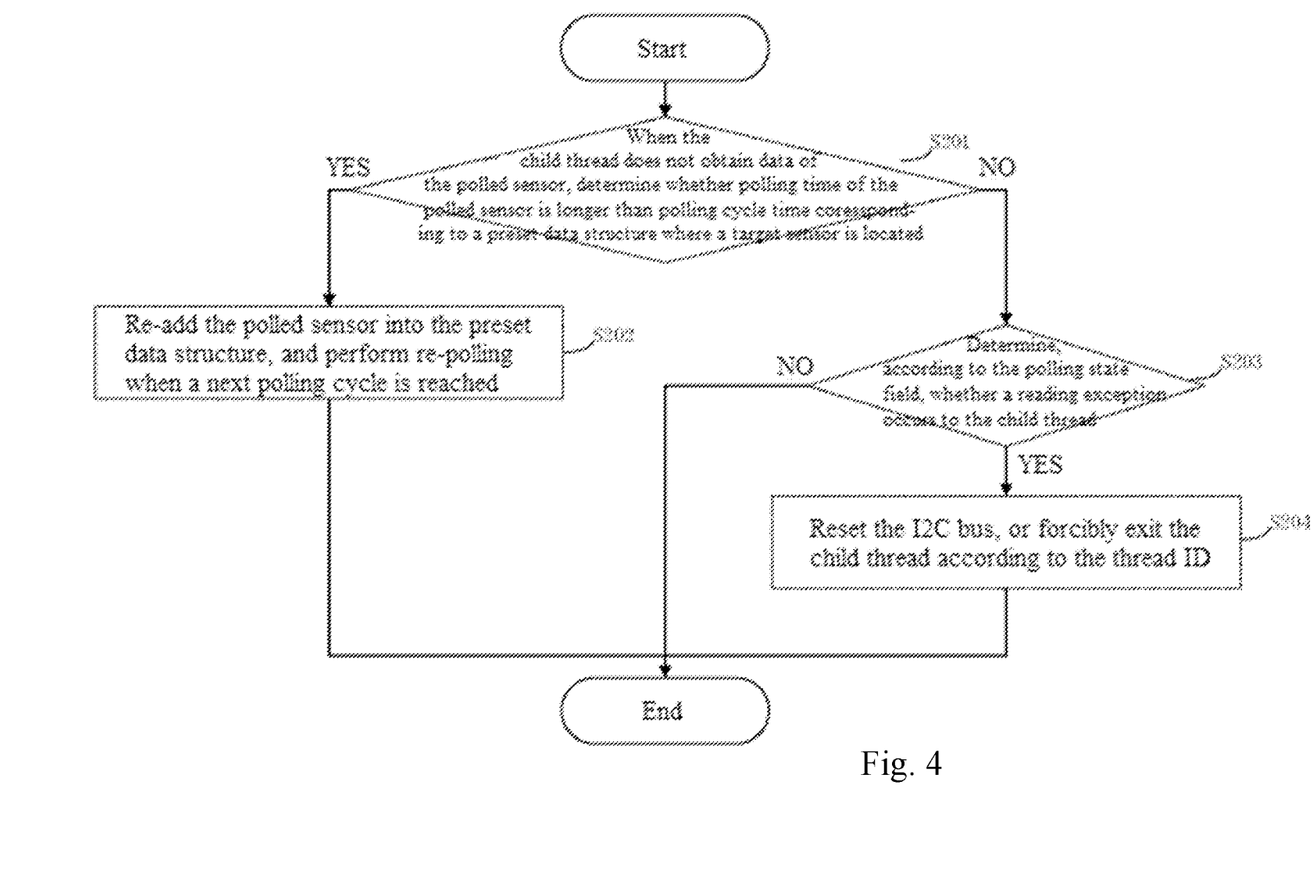
FIG. 4 is a flowchart of processing a polling exception according to an embodiment of the present application.

Based on this, as a preferred embodiment, referring to FIG. 4, FIG. 4 is a flowchart of processing a polling exception according to an embodiment of the present application. A polling exception process and processing thereof are further defined below.

In S201, when the child thread does not obtain data of the polled sensor, whether polling time of the polled sensor is longer than polling cycle time corresponding to a preset data structure where a target sensor is located may be determined. If YES, S202 is performed. If NO, S203 is performed.

In S202, the polled sensor is re-added into the preset data structure, and re-polling is performed when a next polling cycle is reached.

In S203, whether a reading exception occurs to the child thread is determined according to the polling state field. If YES, S204 is performed.

In S204, the I2C bus is reset, or the child thread is forcibly exited according to the thread ID.

The present embodiment aims to perform exception source tracing by use of thread attribute information and polling process information (including, but not limited to, the thread ID, the polling state field, and the I2C bus) stored in the polled sensor when data of the sensor is not obtained by thread polling. When a reading exception occurs to the polling child thread, the I2C bus may be reset, or the child thread may be forcibly exited according to the thread ID. Certainly, when the reading exception does not occur to the child thread, no processing is performed, and next polling is performed when a next polling cycle is reached.

The above process is defined for the first mode described above. However, in practice, during polling using independent threads, the thread ID of the child thread, the polling state field, and the I2C bus may still be recorded in the polled sensor, and meanwhile, the subsequent steps when the child thread does not obtain the data of the polled sensor are performed. Repeated descriptions are omitted herein.

Based on the above-mentioned embodiment, as a preferred embodiment, when the reading exception occurs to the child thread, an alert log may further be generated and uploaded according to the polling state field.

Figure 5:
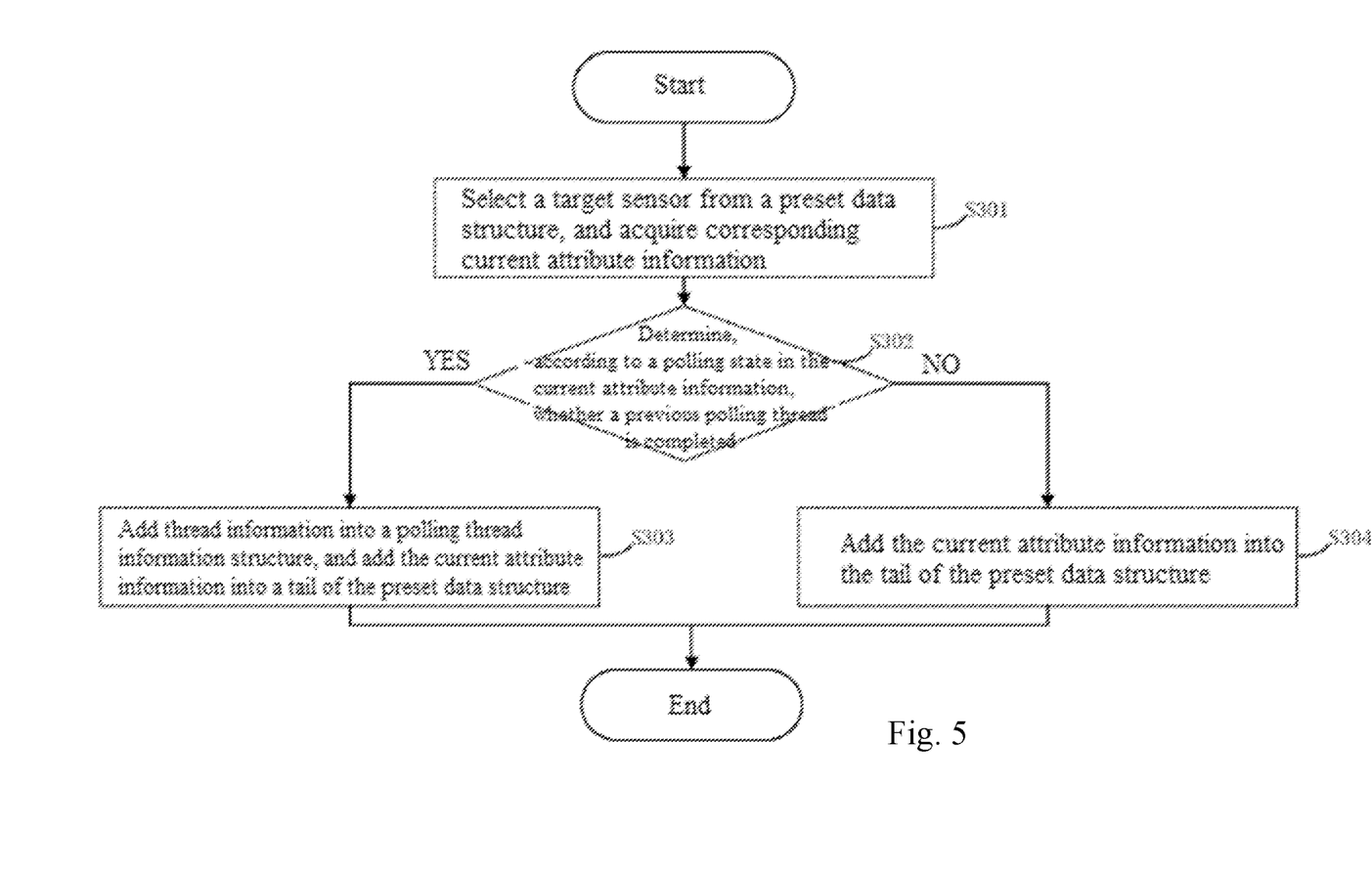
FIG. 5 is a flowchart of a sensor polling process according to an embodiment of the present application.

Based on the above-mentioned embodiment, referring to FIG. 5, FIG. 5 is a flowchart of a sensor polling process according to an embodiment of the present application. When the polling cycle of any sensor is reached, the following steps may further be included.

In S301, a target sensor is selected from a preset data structure, and corresponding current attribute information is acquired.

In S302, whether a previous polling thread is completed is determined according to a polling state in the current attribute information. If YES, S303 is performed. If NO, S304 is performed.

In S303, thread information is added into a polling thread information structure, and the current attribute information is added into a tail of the preset data structure.

In S304, the current attribute information is added into the tail of the preset data structure.

Since the polling cycles of all sensors in a preset data structure are the same, when the polling cycle is reached, the sensors need to be polled, a sensor may be selected from the preset data structure, and current attribute information thereof is acquired. It is to be noted that the current attribute information may also include a sensor type and other information.

Then, whether a previous polling thread of the present preset data structure is completed is determined according to a polling state in the current attribute information. If YES, thread information is added into a polling thread information structure, and the current attribute information is added into a tail of a queue. It is to be noted that the polling thread information structure is a part of the current attribute information.

If NO, it is only necessary to add the current attribute information into the tail of the preset data structure, and the above determination process is re-performed when a next polling cycle is reached.

It is to be noted that, when polling threads are initiated for all the sensors in the preset data structure, sensor polling cycle holding is performed. Polling cycle holding refers to that the main thread corresponding to the preset data structure waits for the end of the child thread corresponding to each sensor when polling threads are initiated for all the sensors. If the child thread ends, thread attribute information of the sensor is cleared.

According to the embodiment of the present application, information about each sensor, including thread attribute information (used for indicating whether the sensor is being monitored or has been monitored) of each sensor, in the same polling cycle is stored and managed by a preset data structure. Each sensor is monitored by a child thread initiated by a main thread. When a polling cycle corresponding to the preset data structure is reached, if the thread attribute information in a sensor selected from the preset data structure indicates that a previous round of monitoring has been completed, the main thread (managing each sensor in the preset data structure, i.e., a thread corresponding to the preset data structure) initiates a new child thread (configured to monitor the sensor only) to monitor the sensor, and child thread information of the sensor is added into the thread attribute information of the sensor. When the thread is completed, attribute information of the sensor is cleared to indicate that polling has been completed. If the previous round of monitoring of the sensor is still not completed when the polling cycle is reached (whether the previous round of monitoring is completed may be determined according to the thread attribute information of the sensor), the attribute information is added into the tail of the queue. That is, the sensor is not monitored in this cycle until a next cycle is reached.

According to the present application, all sensors in the BMC are managed by preset data structures based on the characteristic of first-in first-out of the preset data structure, all the sensors are added into different preset data structures according to polling cycles, each thread manages a preset data structure, and when the polling cycles are reached, each sensor is polled by a child thread. As such, each sensor may be polled independently, and influences between polling of the sensors is minimized.

The polling method for server sensors in the present application will be described below taking a circular queue as a preset data structure and the above-mentioned second mode as a specific application process.

In step 1, circular queues are created, and implementation structures of the circular queues are defined, including read offsets, write offsets, sizes of the circular queues, data pointers of the circular queues, and externally presented enqueueing and dequeueing interface functions.

In step 2, when a BMC is activated, attribute information of all sensors is acquired, including sensor types, sensor numbers, polling cycles, thresholds, etc. Polling thread information structures of the sensors may further be customized in the attribute information.

In step 3, the BMC classifies the sensors according to the polling cycles.

In step 4, the BMC adds the sensors with a same polling cycle into a same circular queue according to a classification result.

In step 5, the BMC initiates independent threads according to the number of the created circular queues, wherein each independent thread manages a circular queue.

In step 6, when an independent thread is used to manage the corresponding circular queue, if the polling cycle of the sensors in the circular queue has been reached, the independent thread performs polling according to an addition sequence of the sensors in the circular queue.

In step 7, the independent thread determines, according to a polling state of the sensor, whether a previous polling thread of the sensor has been completed. If NO, the attribute information is re-added into a tail of the circular queue. If YES, a thread is initiated to poll the sensor in this cycle, thread information is added into the polling thread information structure of the sensor, and meanwhile, the attribute information of the sensor is added into the tail of the queue.

In step 8, when polling threads are initiated for all the sensors in the circular queue, sensor polling cycle holding is performed.

In step 9, when a polling cycle of the sensor is reached, step 6 is repeated.

Figure 6:
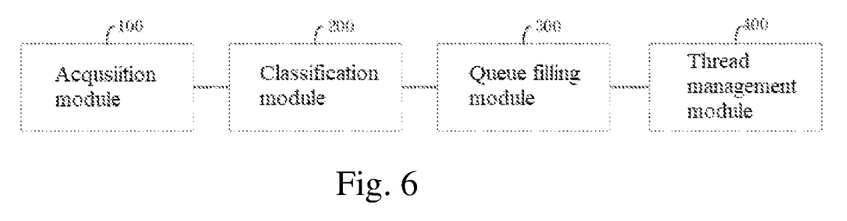
FIG. 6 is a schematic structural diagram of a polling system for server sensors according to an embodiment of the present application.

The below introduces a schematic structural diagram of a polling system for server sensors according to an embodiment of the present application. The polling system described below and the above-described polling method for server sensors may correspondingly refer to each other.

Referring to FIG. 2, FIG. 2 is a schematic structural diagram of a polling system for server sensors according to an embodiment of the present application. The present application also provides a polling system for server sensors, including:

an acquisition module 100, configured to, when a BMC is activated, acquire attribute information of sensors;

a classification module 200, configured to classify the sensors according to polling cycles in the attribute information;

a queue filling module 300, configured to add the sensors with a same polling cycle into a same preset data structure; and a thread management module 400, configured to poll the sensors in the preset data structure using a thread.

Based on the above-mentioned embodiment, as a preferred embodiment, the queue filling module 300 includes:

a filling unit, configured to preferentially add the sensors with high priorities in the sensors with the same polling cycle into the same preset data structure.

Based on the above-mentioned embodiments, as a preferred embodiment, the thread management module 400 may include:

a first thread management unit, configured to, when the cycle corresponding to the preset data structure is reached, poll the sensors in the preset data structure using child threads initiated by a main thread of the BMC, wherein the number of the child threads corresponds to the number of the sensors in the preset data structure.

Based on the above-mentioned embodiments, as a preferred embodiment, the thread management module 400 may include:

a second thread management unit, configured to allocate an independent thread to each preset data structure using a main thread of the BMC, and when the cycle corresponding to the preset data structure is reached, poll the sensors in the preset data structure using the independent thread.

Based on the above-mentioned embodiments, as a preferred embodiment, the system may further include:

a polling module, configured to, when the polling cycle of any sensor is reached, select a target sensor from a preset data structure, and acquire corresponding current attribute information; determine, according to a polling state in the current attribute information, whether a previous polling thread is completed; if YES, add thread information into a polling thread information structure, and add the current attribute information into a tail of the preset data structure; and if NO, add the current attribute information into the tail of the preset data structure.

Based on the above-mentioned embodiments, as a preferred embodiment, the system may further include:

a polling holding module, configured to, when polling threads are initiated for all the sensors in the preset data structure, perform sensor polling cycle holding.

Based on the above-mentioned embodiments, as a preferred embodiment, the system may further include:

a preset data structure creation module, configured to define a read offset, write offset, queue size, and data pointer of the preset data structure to create the preset data structure.

Based on the above-mentioned embodiments, as a preferred embodiment, the first thread management unit may further include:

a recording subunit, configured to, during the polling of the sensors in the preset data structure using the child threads initiated by the main thread of the BMC, record, in a polled sensor, a thread ID of the child thread, a polling state field, and an I2C bus.

Based on the above-mentioned embodiments, as a preferred embodiment, the first thread management unit may further include:

a polling exception processing subunit, configured to, when the child thread does not obtain data of the polled sensor, determine whether polling time of the polled sensor is longer than polling cycle time corresponding to a preset data structure where a target sensor is located; if YES, re-add the polled sensor into the preset data structure, and perform re-polling when a next polling cycle is reached; if NO, determine, according to the polling state field, whether a reading exception occurs to the child thread; and when the reading exception occurs to the child thread, reset the I2C bus, or forcibly exit the child thread according to the thread ID.

Based on the above-mentioned embodiments, as a preferred embodiment, the first thread management unit may further include:

an exception alerting subunit, configured to, when the reading exception occurs to the child thread, generate and upload an alert log according to the polling state field.

The present application also provides a computer-readable memory medium, storing a computer program that may be executed to implement the steps provided in the above-mentioned embodiment. The memory medium may include various media capable of storing program codes, such as a U disk, a mobile hard disk, a Read-Only Memory (ROM), a Random Access Memory (RAM), a magnetic disk, or an optical disk.

Each embodiment in the specification is described progressively. Descriptions made in each embodiment focus on differences with the other embodiments, and the same or similar parts in each embodiment refer to the other embodiments. The system provided in the embodiments corresponds to the method provided in the embodiments, and thus is described relatively simply, and related parts refer to part of the descriptions about the method.

The principle and implementation modes of the present application are described herein with specific examples, and the descriptions about the above embodiments are only for helping in understanding the method and core idea of the present application. It is to be pointed out that those ordinarily skilled in the art may further make a plurality of improvements and embellishments to the present application without departing from the principle of the present application, and these improvements and embellishments shall also fall within the scope of protection of the claims of the present application.

It is also to be noted that relational terms in the specification, such as first and second, are used only to distinguish an entity or operation from another entity or operation and does not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements which are not clearly listed, or further includes elements intrinsic to the process, the method, the object, or the device. With no more restrictions, an element defined by statement "including a/an . . . " does not exclude the existence of the same other elements in a process, method, object, or device including the element.

What is claimed is:

1. A polling method for server sensors, comprising:
   in response to a Baseboard Management Controller (BMC) being activated, acquiring attribute information of sensors;
   classifying the sensors according to polling cycles in the attribute information;
   adding the sensors with a same polling cycle into a same preset data structure, wherein the step of adding the sensors with the same polling cycle into the same preset data structure comprises:
      adding the sensors with high priorities in the sensors with the same polling cycle into the same preset data structure; and
   polling the sensors in the preset data structure using a thread.

2. The polling method according to claim 1, wherein the preset data structure comprises a circular queue, a linear queue, or an array.

3. The polling method according to claim 2, wherein the step of polling the sensors in the preset data structure using the thread comprises:
   in response to a cycle corresponding to the preset data structure being reached, polling the sensors in the preset data structure using child threads initiated by a main thread of the BMC,
   wherein a number of the child threads corresponds to a number of the sensors in the preset data structure.

4. The polling method according to claim 2, wherein the step of polling the sensors in the preset data structure using the thread comprises:
   allocating an independent thread to each preset data structure using a main thread of the BMC; and
   in response to a cycle corresponding to the preset data structure being reached, polling the sensors in the preset data structure using the independent thread.

5. The polling method according to claim 1, wherein the step of polling the sensors in the preset data structure using the thread comprises:
   in response to a cycle corresponding to the preset data structure being reached, polling the sensors in the preset data structure using child threads initiated by a main thread of the BMC,
   wherein a number of the child threads corresponds to a number of the sensors in the preset data structure.

6. The polling method according to claim 5, wherein during the polling of the sensors in the preset data structure using the child threads initiated by the main thread of the BMC, the method further comprises:
   recording, in a polled sensor, a thread Identifier (ID) of the child thread, a polling state field, and an Inter-Integrated Circuit (I2C) bus.

7. The polling method according to claim 6, wherein in a circumstance where the child thread does not obtain data of the polled sensor, the method further comprises:
   determining whether polling time of the polled sensor is longer than polling cycle time corresponding to the preset data structure where a target sensor is located;
   in response to the polling time of the polled sensor being longer than the polling cycle time corresponding to the preset data structure where the target sensor is located, re-adding the polled sensor into the preset data structure, and performing re-polling in response to a next polling cycle being reached;
   in response to the polling time of the polled sensor not being longer than the polling cycle time corresponding to the preset data structure where the target sensor is located NO, determining, according to the polling state field, whether a reading exception occurs to the child thread; and
   in response to the reading exception occurring to the child thread, resetting the I2C bus, or forcibly exiting the child thread according to the thread ID.

8. The polling method according to claim 7, wherein in a circumstance where the reading exception occurs to the child thread, the method further comprises:
   generating and uploading an alert log according to the polling state field.

9. The polling method according to claim 1, wherein the step of polling the sensors in the preset data structure using the thread comprises:
   allocating an independent thread to each preset data structure using a main thread of the BMC; and
   in response to a cycle corresponding to the preset data structure being reached, polling the sensors in the preset data structure using the independent thread.

10. The polling method according to claim 9, wherein the step of polling the sensors in the preset data structure using the independent thread comprises:
    polling the sensors in the preset data structure using the independent thread one by one.

11. The polling method according to claim 9, wherein the step of polling the sensors in the preset data structure using the independent thread comprises:
    transmitting, by the independent thread, child threads to poll the sensors in the preset data structure respectively.

12. The polling method according to claim 1, wherein in a circumstance where the polling cycle of any sensor is reached, the method further comprises:
    selecting a target sensor from the preset data structure, and acquiring corresponding current attribute information;
    determining, according to a polling state in the current attribute information, whether a previous polling thread is completed;
    in response to the previous polling thread being completed, adding thread information into a polling thread information structure, and adding the current attribute information into a tail of the preset data structure; and
    in response to the previous polling thread not being completed, adding the current attribute information into the tail of the preset data structure.

13. The polling method according to claim 1, wherein the polling method further comprises:
    in response to polling threads being initiated for all the sensors in the preset data structure, performing sensor polling cycle holding.

14. The polling method according to claim 1, wherein the polling method further comprises:
    defining a read offset, write offset, queue size, and data pointer of the preset data structure to create the preset data structure.

15. A non-transitory computer-readable memory medium, storing a computer program, wherein the computer program is executed by a processor to implement any steps of the method according to claim 1.

16. The polling method according to claim 1, wherein the attribute information further includes a sensor type, a sensor number, and a polling thread information structure.

17. The polling method according to claim 1, wherein the sensors with the same polling cycle are divided into a same class, and the sensors with the same polling cycle are added into the same preset data structure.

18. The polling method according to claim 1, wherein the preset data structure is created by default.

19. The polling method according to claim 18, wherein the preset data structure is created by use of a definition of parameter information, including a read offset, write offset, queue size, and data pointer of the preset data structure.

* * * * *